United States Patent Office 3,499,751
Patented Mar. 10, 1970

3,499,751
METHOD AND COMPOSITION FOR CONTROLLING WEEDS WITH ACYLATED TETRAHYDRONAPHTHALENE
Thomas F. Wood, Wayne, N.J., and Wilbur F. Evans, Springhouse, Pa., assignors, by direct and mesne assignments, to Givaudan Corporation, Clifton, N.J., a corporation of New Jersey
No Drawing. Filed July 5, 1966, Ser. No. 562,494
Int. Cl. A01n 9/00; C07c 15/24
U.S. Cl. 71—123                                            5 Claims

ABSTRACT OF THE DISCLOSURE

The use of herbicides is disclosed of compounds having the formula:

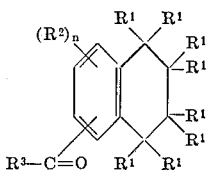

wherein $R^1$ is selected from the group consisting of hydrogen and alkyl radicals having from 1 to 5 total carbon atoms with the proviso that at least two of the $R^1$ radicals must be hydrogen; $R^2$ is selected from the group consisting of halogen and alkyl radicals having from 1 to 5 total carbon atoms; $R^3$ is selected from the group consisting of hydrogen and alkyl, alkenyl, alkynyl, cycloalkyl and cycloalkenyl radicals having from 1 to 11 total carbon atoms; and wherein $n$ is an integer of 1 to 3.

---

This invention relates to the use of certain compounds for purposes of controlling weeds. More particularly, this invention relates to the use of acylated tetrahydronaphthalene compounds having the structure:

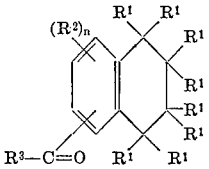

wherein $R^1$ is selected from the group consisting of hydrogen and alkyl radicals having from 1 to 5 total carbon atoms with the proviso that at least two of the $R^1$ radicals must be hydrogen; $R^2$ is selected from the group consisting of halogen and alkyl radicals having from 1 to 5 total carbon atoms; $R^3$ is selected from the group consisting of hydrogen and alkyl, alkenyl, alkynyl, cycloalkyl and cycloalkenyl radicals having from 1 to 11 total carbon atoms; and wherein $n$ is an integer of 1 to 3.

The acylated tetrahydronaphthalene compounds of the present invention have been found to possess high levels of herbicidal activity and to be useful in controlling undesirable plants of both monocotyledonous and dicotyledonous types when applied on a pre-emergence basis. It has also been discovered that the compounds of the present invention possess high rates of herbicidal activity on both emerged and submerged aquatic weed species.

The term "pre-emergence" herein means that the compounds are applied to the soil prior to emergence of the weed species sought to be controlled. This term, as used herein, also means the application of the herbicidal compound falling within the scope of this disclosure to areas wherein useful or desirable plants are growing but where feeds sought to be controlled have not as yet emerged.

In order to illustrate the herbicidal activity of the compounds falling under the purview of this invention there are presented below a series of test results which are reported solely by way of illustration and are not in any way intended to be construed as a limitation of the scope of this invention.

Seeds of at least two types of common weed varieties from the class of wild oats (*Avena fatua*), cheatgrass (*Bromus secalinus*), foxtail (*Setaria faberii*), barnyard grass (*Echinochloa crusgalli*), crabgrass (*Digitaria ischaemum*), nut grass (*Cyperus esculentus*), Johnson grass (*Sorghum halepense*), curled dock (*Rumex crispus*), yellow rocket (*Barbarea vulgaris*), chickweed (*Stellaria media*), pigweed (*Amarantus retroflexus*), velvet leaf (*Abutilon theophrasti*) and lambsquarter (*Chenopodium album*) were planted in soil under green house conditions. Immediately after planting, the soil surface was sprayed with aqueous solutions or suspensions of these compounds so as to apply the equivalent of 16 lbs. of the compound under test per acre of soil surface. The aqueous solutions or suspensions were produced by stirring acetone and/or alcohol solutions of these compounds into water. Three weeks after spray application the herbicidal activity of these compounds was determined in comparison with untreated control areas. The observed activity is reported in the following table wherein the average activity rating on two or more of the weed varieties included in the tests is reported as the percent control of growth.

TABLE 1

| Example No. | Compound | Percent total control of weeds |
|---|---|---|
| 1 | Check | 0 |
| 2 | 7-acetyl-6-ethyl-1, 1, 4, 4-tetramethyl-1, 2, 3, 4-tetrahydronaphthalene. | 100 |
| 3 | 7-acetyl-1, 1, 3, 4, 4, 6-hexamethyl-1, 2, 3, 4-tetrahydronaphthalene. | 100 |
| 4 | 7-propionyl-1, 1, 3, 4, 4, 6-hexamethyl-1, 2, 3, 4-tetrahydronaphthalene. | 100 |
| 5 | 7-butyryl-1, 1, 3, 4, 4, 6-hexamethyl-1, 2, 3, 4-tetrahydronaphthalene. | 100 |
| 6 | 7-isobutyryl-1, 1, 3, 4, 4, 6-hexamethyl-1, 2, 3, 4-tetrahydronaphthalene. | 100 |
| 7 | 7-acetyl-1, 1-dimethyl-1, 2, 3, 4-tetrahydronaphthalene. | 85 |
| 8 | 6-acetyl-1, 4, 4-trimethyl-1, 2, 3, 4-tetrahydronaphthalene. | 80 |
| 9 | 7-acetyl-1, 1, 4-trimethyl-1, 2, 3, 4-tetrahydronaphthalene. | 80 |
| 10 | 7-acetyl-1, 4, 6-trimethyl-1, 2, 3, 4-tetrahydronaphthalene. | 90 |
| 11 | 7-acetyl-4, 4, 6-trimethyl-1, 2, 3, 4-tetrahydronaphthalene. | 80 |
| 12 | 7-acetyl-1, 1, 6-trimethyl-1, 2, 3, 4-tetrahydronaphthalene. | 75 |
| 13 | 7-acetyl-1, 1, 4, 6-tetramethyl-1, 2, 3, 4-tetrahydronaphthalene. | 100 |
| 14 | 6-acetyl-1, 4, 4, 7-tetramethyl-1, 2, 3, 4-tetrahydronaphthalene. | 100 |
| 15 | 7-acetyl-1, 1, 4, 4-tetramethyl-1, 2, 3, 4-tetrahydronaphthalene. | 70 |
| 16 | 7-acetyl-1, 4-dimethyl-1-ethyl-1, 2, 3, 4-tetrahydronaphthalene. | 70 |
| 17 | 7-acetyl-1, 4-dimethyl-4-ethyl-1, 2, 3, 4-tetrahydronaphthalene. | 70 |
| 18 | 7-acetyl-1, 1-dimethyl-6-ethyl-1, 2, 3, 4-tetrahydronaphthalene. | 95 |
| 19 | 6-acetyl-1, 1-dimethyl-4-isopropyl-1, 2, 3, 4-tertrahydronaphthalene. | 75 |
| 20 | 7-acetyl-1, 1-dimethyl-4-isopropyl-1, 2, 3, 4-tetrahydronaphthalene. | 75 |
| 21 | 7-acetyl-1, 1, 2, 4, 4-pentamethyl-1, 2, 3, 4-tetrahydronaphthalene. | 95 |
| 22 | 7-acetyl-1, 1, 3, 4, 4-pentamethyl-1, 2, 3, 4-tetrahydronaphthalene. | 95 |
| 23 | 7-acetyl-1, 1, 4, 4, 6-pentamethyl-1, 2, 3, 4-tetrahydronaphthalene. | 85 |
| 24 | 7-propionyl-1, 1, 4, 4, 6-pentamethyl-1, 2, 3, 4-tetrahydronaphthalene | 100 |
| 25 | 7-acetyl-1, 1, 2, 4, 6-pentamethyl-1, 2, 3, 4-tetrahydronaphthalene. | 95 |
| 26 | 6-acetyl-1, 1, 2, 4, 7-pentamethyl-1, 2, 3, 4-tetrahydronaphthalene. | 95 |

TABLE 1—Continued

| Example No. | Compound | Percent total control of weeds |
|---|---|---|
| 27 | 7-acetyl-1,4,6-trimethyl-1-ethyl-1,2,3,4-tetrahydronaphthalene. | 95 |
| 28 | 7-acetyl-1,4,6-trimethyl-4-ethyl-1,2,3,4-tetrahydronaphthalene. | 95 |
| 29 | 7-propionyl-1,1,4,4-tetramethyl-6-ethyl-1,2,3,4 tetrahydronaphthalene. | 100 |
| 30 | 7-isobutyryl-1,1,4,4-tetramethyl-6-ethyl-1,2,3,4-tetrahydronaphthalene. | 100 |
| 31 | 7-acetyl-1,4,6-trimethyl-1,4-diethyl-1,2,3,4-tetrahydronaphthalene. | 75 |
| 32 | 7-acetyl-1,1,4,6-tetramethyl-4-ethyl-1,2,3,4-tetrahydronaphthalene. | 85 |
| 33 | 7-acetyl-1,4,4,6-tetramethyl-1-ethyl-1,2,3,4-tetrahydronaphthalene. | 85 |
| 34 | 7-acetyl-1,4-dimethyl-1,4,5-triethyl-1,2,3,4-tetrahydronaphthalene. | 90 |
| 35 | 7-acetyl-4,4-dimethyl-1,2,3,4-tetrahydronaphthalene. | 100 |
| 36 | 7-acetyl-1,1,6-trimethyl-4-isopropyl-1,2,3,4-tetrahydronaphthalene. | 75 |
| 37 | 6-acetyl-1,1,7-trimethyl-4-isopropyl-1,2,3,4-tetrahydronaphthalene. | 75 |
| 38 | 7-acetyl-6-chloro-1,1,4,4-tetramethyl-1,2,3,4-tetrahydronaphthalene. | 90 |
| 39 | 7-acetyl-6-fluoro-1,1,4,4-tetramethyl-1,2,3,4-tetrahydronaphthalene. | 75 |
| 40 | 7-acetyl-6-bromo-1,1,4,4-tetramethyl-1,2,3,4-tetrahydronaphthalene. | 95 |
| 41 | 7-propionyl-6-bromo-1,1,4,4-tetramethyl-1,2,3,4-tetrahydronaphthalene. | 95 |

For practical use as herbicides, the compounds of this invention may be formulated with conventional agricultural carriers to obtain the desired concentration and to facilitate handling. For example, these compounds may be formulated into dusts by combining them with such materials as talc or clays. Wettable powder formulations may be obtained by adding a dispersing or suspending agent to the dust formulations referred to above.

If desired, the compounds of this invention may be applied as spray solutions which can be prepared by dissolving the compounds in suitable solvents, such as water, xylene, methylated naphthalenes, kerosenes, common agricultural oils, etc. in accordance with well established agricultural practices. The choice of solvent to be used will be dictated by the solubility of the compound sought to be sprayed in that particular solvent system. Generally, it has been found that most of these compounds have a relatively low order of water solubility, so that the use of common agricultural organic solvents is the preferred practice.

The compounds of this invention may also be emulsified or suspended in water by adding wetting agents or emulsifying agents to aqueous systems containing one or more of the chemical compounds falling under this disclosure. These emulsified formulations are suitable for use in spraying directly upon the locus sought to be protected from undesirable vegetation. So far as has been determined no significant difference in effect is realized from the use of aqueous emulsified formulations or from organic solvent solutions of these herbicides, providing, of course, that a similar amount of chemical is employed in each instance of use.

So far as concerns the amount of herbicide to be used, this is, of course, subject to such considerations as the type of treatment to be made, the area to be treated, the type of weeds sought to be controlled and the stage of development of the species being sprayed. Generally, however, concentrated herbicidal compositions of the present invention are prepared so as to contain from 5 to about 60% of the active herbicidal component. Compositions which are suitable for "as is" application generally contain from 0.1% to about 10% of active herbicidal component.

As a further illustration of the herbicidal activity of the compounds of this invention, there are presented below additional test results obtained from utilization of these compounds in the eradication of both terrestrial and aquatic weeds.

EXAMPLE 42

A water-ethanol solution of 7-isobutyryl-1,1,3,4,4,6-hexamethyl-1,2,3,4-tetrahydronaphthalene was sprayed over soil which was freshly sown to crabgrass (*Digitaria ischaemum*), barnyard grass (*Echinochloa crusgalli*), cheat grass (*Bromus secalinus*), wild oats (*Avena fatua*) and foxtail (*Setaria faberii*) seeds. Spraying was effected at a rate equivalent to 4 lbs. of the active herbicidal agent per acre of soil surface. At the time of spraying no plant growth was visible in the treated area. Approximately 3 weeks after spraying, an inspection of the treated area showed 80 to 100% control of these undesirable grass species as compared to untreated areas.

EXAMPLE 43

7-propionyl-1,1,3,4,4,6-hexamethyl - 1,2,3,4 - tetrahydronaphthalene dissolved in a methylated naphthalene-alcohol solution, was sprayed over soil which had been sown to wild oats (*Avena fatua*), crabgrass (*Digitaria ischaemum*), cheat grass (*Bromus secalinus*), barnyard grass (*Echinochloa crusgalli*) and foxtail (*Setaria faberii*) at a rate so as to apply the equivalent of 4 lbs. of the herbicidal agent per acre of soil surface. At the time of spraying there was no visible plant growth in the treated area. Three weeks after spray application the treated area was inspected and from 95 to 100% control was observed for these weed species as compared to untreated areas.

EXAMPLE 44

An aqueous-acetone solution of 7-acetyl-1,4-diethyl-1,4,6-trimethyl-1,2,3,4-tetrahydronaphthalene was sprayed over soil which was freshly sown to crabgrass (*Digitaria ischaemum*). This compound was applied at a rate equivalent to 16 lbs./acre, and at the time of spraying there was no plant growth in the treated area. Four weeks after spray application an inspection of the treated area showed that 90% control was obtained over this undesirable grass species.

EXAMPLE 45

A rate equivalent to 4 lbs./acre of the compound 7-propionyl-1,1,4,4-tetramethyl-6-ethyl - 1,2,3,4 - tetrahydronaphthalene was sprayed over an area freshly seeded to cheat grass (*Bromus secalinus*), crabgrass (*Digitaria ischaemum*), Johnson grass (*Sorghum halepense*) and barnyard grass (*Echinochloa crusgalli*). Spraying was effected from an aqueous—methylated naphthalene/alcohol solution of the active ingredient, and was accomplished at a time when there was no plant growth in the test area. Approximately two weeks after spraying an inspection of the treated area showed that from 90 to 100% control was being obtained over these plant species.

EXAMPLE 46

A water-ethanol solution of 7-isobutyryl-1,1,4,4-tetramethyl-6-ethyl-1,2,3,4-tetrahydronaphthalene was sprayed over soil freshly seeded with cheat grass (*Bromus secalinus*), wild oats (*Avena fatua*), crabgrass (*Digitaria ischaemum*), Johnson grass (*Sorghum halepense*), barnyard grass (*Echinochloa crusgalli*) and foxtail (*Setaria faberii*). Spraying was effected so as to apply a rate of active herbicide equivalent to 4 lbs./acre, and at the time of spraying there was no noticeable plant growth in the test area. Approximately two weeks after spraying visual inspection showed from 90 to 100% control was being obtained over the weed species.

EXAMPLE 47

Example 44 was repeated, using 7-acetyl-1,1,3,4,4,6-hexamethyl-1,2,3,4-tetrahydronaphthalene in place of 7-acetyl - 1,4,6 - trimethyl - 1,4-diethyl-1,2,3,4-tetrahydronaphthalene. Four weeks after spray application as set forth in Example 44 an inspection of the treated area showed that 100% control was obtained over the crabgrass.

If it is desired to effect substantially complete elimination of vegetation through use of one or more compounds of this invention, it is then necessary to apply a higher rate of the chemical agent, for example from 20 to 40 lbs./acre thereof, so as to obtain substantial soil sterilization.

Effective aquatic weed control can be accomplished by very low concentrations of the herbicidally active compounds of the present invention as is demonstrated by the following results:

EXAMPLE 48

Compounds of Examples 8, 9, 11, 12, 13, 14, 16, 17 and 18, as identified above in Table 1, were each applied to separate water plots wherein there was growing emerged aquatic weeds of the water fern species (*Salvinia rotundifolia*). Each of these compounds was applied so as to obtain a rate of 10 parts of the active chemical agent per 1 million parts of water.

Approximately three weeks after introducing the compounds to the aqueous systems containing the water fern plants, an inspection revealed that from 90 to 100% control was being obtained over the weed species as compared with untreated areas.

EXAMPLE 49

10 parts of the compound 7-acetyl-1,1,4,4-tetramethyl-1,2,3,4-tetrahydronaphthalene were added to one million parts of water wherein there was growing emerged aquatic plants of the species *Myriophyllum brasiliense*. Thirty-two days after adding this compound to the water an inspection revealed that 90% control had been obtained over this particular aquatic weed relative to control or untreated tests.

The compounds found to be suitable for use in the present invention may be prepared by acylation of the parent polyalkyl - 1,2,3,4-tetrahydronaphthalene derivative using the more or less standard techniques where the acylating agent is prepared from an acid chloride or an anhydride by treatment with a "Lewis" acid. It is preferred to use anhydrous aluminum chloride. The general procedure which gives good results is as follows:

A solution of 1 mol of the 1,2,3,4-tetrahydronaphthalene derivative and 1.1 mols of the acyl chloride (acetyl, propionyl, isobutyryl, etc.) is added dropwise during the course of 30 to 60 min. to a suspension of 1.15 to 1.20 mols of ground (small granules) anhydrous aluminum chloride in ethylene dichloride solvent with stirring at 20–25°. After stirring one hour longer at 25° the batch is quenched and worked up in the usual manner. Other solvents suitable for use in the Friedel-Crafts acylation reaction are $CS_2$, petroleum ether, methylenechloride, carbon tetrachloride, nitrobenzene and nitroparaffins. We prefer to use ethylene dichloride although carbon tetrachloride and methylenechloride are almost as satisfactory. In cases where the substituted polyalkyl-1,2,3,4-tetrahydronaphthalene to be acylated contains labile groups which readily undergo migration or dealkylate, we prefer to acylate at around 0° using a preformed complex of aluminum chloride and the acid chloride in carbon tetrachloride or ethylene dichloride to which the hydrocarbon is added over a 2 to 4-hour period (Perrier, Ber., 33,815, modification of the Friedel-Crafts acylation reaction). In fact, this modification gives excellent results with nearly all polyalkyl-1,2,3,4-tetrahydronaphthalenes. While the above procedures are preferred, it is possible to change the ratio of reactants and still get good results. However, in order to fully utilize the acylating agent, the molar ratio of aluminum chloride must be at least 1:1 and 2:1 when the acid anhydride is used instead of the chloride. An excess of the 1,2,3,4-tetrahydronaphthalene derivative can be used, even enough to serve as reaction solvent. This modification is usually inadvisable since it offers no advantage over the use of the usual inexpensive Friedel-Crafts solvents which have greater solvent power. These solvents can be used in the varying amounts needed to provide good mixing when stirred. Time for carrying out the acylation procedure may vary from 1 to 10 hours of more depending on the individual case. Completion of the reaction is shown when HCl gas stops coming from the reaction. The reaction temperature can be varied from −30 to 60°. The preferred range is 0 to 25°.

Details of the preparation of some of the active compounds rae given in the following examples.

EXAMPLE 50

Preparation of 7-isobutyryl-1,1,3,4,4,6-hexamethyl-1,2,3,4-tetrahydronaphthalene A soluble complex was prepared by feeding 27 grams of isobutyrylchloride into a cold, rapidly stirred, suspension of 39 grams of aluminum chloride in 50 grams of ethylenedichloride, kept at −5 to −1° C., over a 15-minute period. Thereafter a solution of 54 grams of 1,1,3,4,4,6-hepamethyl-1,2,3,4-tetrahydronaphthalene dissolved in 40 grams of ethylenedichloride was fed into the cold complex solution over a 3½ hour period. During this time the reaction temperature was kept at −2 to +2° C. The batch was then quenched on 150 grams of ice and allowed to settle. The aqueous solution was then discarded and the remaining ethylenedichloride solution washed successively with 200 grams of 5% hydrochloric acid solution, 200 grams of water, 200 grams of 5% soda ash solution, 200 grams of water, 200 grams of 5% soda ash solution and finally three times with 200 grams portions of hot water. The washed solution was filtered and distilled to remove solvent. Vacuum-distillation of the crude ketone gave 60 grams of the desired product, B.P. 153° (2 mm.), which rapidly solidified after distillation (M.P. 55–56° C.). The yield was 84% of theory. The compound is active as a pre-emergence herbicide for the control of weeds.

EXAMPLE 51

Preparation of 7-Butryl-1,1,3,4,4,6-hexamethyl-1,2,3,4-tetrahydronaphthalene

A soluble complex was prepared by feeding 27 g. of n-butyryl chloride into a cold, rapidly stirred, suspension of 39 g. of aluminum chloride in 40 g. of ethylene dichloride, kept at −5 to −1°, over a 15 minute period. Then a solution of 54 g. of 1,1,3,4,4,6-hexamethyl-1,2,3,4-tetrahydronaphthalene (Wood et al., P. Org. Chem. 28, 2248 (1963)) dissolved in 40 g. of ethylene dichloride was fend into the cold complex solution over a 3½ hour period. During this time the reaction temperature was kept at −2 to +2°. The batch was then quenched on 150 g. of ice and allowed to settle. The aqueous solution was separated and discarded and the remaining ethylene dichloride solution washed successively with 200 g. of 5% hydrochloric acid solution, 200 g. of water, 200 g of 5% soda ash solution, 200 g. of water, 200 g of 5% soda ash solution and finally three times with 200 g. portions of hot water The washed solution was filtered and distilled to remove solvent. Vacuum-distillation of the crude ketone gave 60 g. of the desired product, B.P. 153° (2 mm.), a colorless viscous liquid, $n_D^{20}$ 1.5265. The yield was 84% of theory. The compound is active as a pre-emergence herbicide for the control of weeds.

EXAMPLE 52

Preparation of 7-acetyl-6-chloro-1,1,4,4-tetramethyl-1,2,3,4-tetrahydronaphthalene (a) 6 - chloro-1,1,4,4 - tetramethyl-1,2,3,4-tetrahydronaphthalene.—A solution of 92 g. of 2,5-dichloro-2,5-dimethylhexane (0.5 mole) in 200 g. of chlorobenzene was slowly fed into a stirred mixture of 10.0 g. aluminum chloride and 137.5 g. of chlorobenzene with the temperature kept at 20–25°. Stirring was continued for 30 minutes after completion of the feeding. there was smooth evolution of hydrogen chloride during the reaction. The batch was quenched and washed in the usual manner and then treated with 20 g. of 30% caustic soda solution at 80°. The solution was then washed free of caustic and distilled for removal of excess chlorobenzene. The crude product was distilled at 2.5 mm. yielding 98 g. of 6-chloro-1,1,4,4-tetramethyl-1,2,3,4-tetrahydronaphthalene, B.P. 94–95°, $n_D^{20}$ 1.5344, $d_4^{20}$ 1.0389, M.P. 33°. The yield was 93.7% of theory.

(b) 7-acetyl - 6-chloro-1,1,4,4 - tetramethyl-1,2,3,4-tetrahydronaphthalene.—Acetylation of 6 - chloro - 1,1,4,4-tetramethyl-1,2,3,4-tetrahydronaphthalene was carried out in the conventional manner to produce the desired ketone, a solid in the form of snow-white crystals, M.P. 53.5–55°, having a faint musty odor.

*Analysis.*—Calcd. for $C_{16}H_{21}ClO$: C, 72.57; H, 7.96; Cl, 13.39. Found: C, 72.57; H, 7.81; Cl, 13.10.

This compound is active as a herbicide in the control of weeds.

EXAMPLE 53

Preparation of 7-acetyl-6-fluoro - 1,1,4,4-tetramethyl-1,2,3,4-tetrahydronaphthalene (a) 6-fluoro - 1,1,4,4-tetramethyl-1,2,3,4 - tetrahydronaphthlene.—This intermediate was synthesized from fluorobenzene by the technique given in Example 52(a) above. The product obtained was a colorless liquid, B.P. 58–60° (0.75 mm.), $n_D^{20}$ 1.5051, Sp. gr. 25°/25° 0.9986.

(b) 7-acetyl - 6-fluoro-1,1,4,4 - tetramethyl - 1,2,3,4-tetrahydronaphthalene.—Acetylation of the above intermediate produced this derivative in the form of snow-white crystals of musty odor, M.P. 68–69.5°.

*Analysis.*—Calcd. for $C_{16}H_{21}OF$: C, 77.35; H, 8.52. Found: C, 77.49; H, 8.56.

This compound is active as a herbicide in the control of weeds.

EXAMPLE 54

Preparation of 7 - acetyl-6-bromo - 1,1,4,4-tetramethyl-1,2,3,4-tetrahydronaphthalene (a) 6-bromo - 1,1,4,4-tetramethyl - 1,2,3,4 - tetrahydro naphthalene (I).—Following the general method of Example 52(a), bromobenzene was cycli-alkylated to produce the desired intermediate, a colorless liquid, B.P. 110–111° (2 mm.), M.P. 35–36°. The compound solidified on standing soon after distillation.

*Analysis.*—Calcd. for $C_{14}H_{19}Br$: C, 62.96; H, 7.14; Br, 29.90. Found: C, 63.06; H, 7.01; Br, 29.76.

(b) 7-acetyl - 6-bromo - 1,1,4,4-tetramethyl - 1,2,3,4-tetrahydronaphthalene.—Acetylation of I produced the desired ketone, a colorless solid, B.P. 155–157° (2 mm.), M.P. 66–68° (cryst. from methanol). The compound is active as a pre-emergence herbicide for the control of weeds.

EXAMPLE 55

Preparation of 7 - propionyl-6-bromo - 1,1,4,4 - tetramethyl-1,2,3,4-tetrahydronaphthalene Propionylation of I, the intermediate described above in Example 54(a), gave this derivative in good yield. It is a colorless solid having the following properties: B.P. 157° (2 mm.), M.P. 57–58° (cryst. from methanol). The compound is active as a pre-emergence herbicide for the control of weeds.

The foregoing illustrates the practice of this invention, which, however, is not to be limited thereby, but is to be construed as broadly as permissible in view of the prior art and limited solely by the appended claims.

We claim:

1. A method for controlling weeds, which consists essentially in applying to the locus to be protected a herbicidally effective amount of a compound selected from the group consisting of 7-acetyl-6-ethyl-1,1,4,4-tetramethyl-1,2,3,4-tetrahydronaphthalene; 7 - acetyl - 1,1,3,4,4,6-hexamethyl-1,2,3,4-tetrahydronaphthalene; 7 - isobutyryl-1,1,3,4,4,6 - hexamethyl - 1,2,3,4 - tetrahydronaphthalene and 7-isobutyryl-1,1,4,4-tetramethyl - 6 - ethyl - 1,2,3,4-tetrahydronaphthalene.

2. The method of claim 1, wherein the compound is 7-acetyl-6-ethyl - 1,1,4,4 - tetramethyl - 1,2,3,4 - tetrahydronaphthalene.

3. The method of claim 1 wherein the compound is 7 - acetyl - 1,1,3,4,4,6 - hexamethyl - 1,2,3,4 - tetrahydronaphthalene.

4. The method of claim 1 wherein the compound is 7-isobutyryl-1,1,3,4,4,6 - hexamethyl - 1,2,3,4 - tetrahydronaphthalene.

5. The method of claim 1 wherein the compound is 7-isobutyryl-1,1,4,4-tetramethyl - 6 - ethyl - 1,2,3,4 - tetrahydronaphthalene.

References Cited

UNITED STATES PATENTS

| | | | |
|---|---|---|---|
| 3,393,994 | 7/1968 | Achuff et al. | 73—123 |
| 3,399,049 | 8/1968 | Evans et al. | 71—123 |
| 2,997,503 | 8/1961 | Carpenter et al. | 260—592 |
| 3,045,047 | 7/1962 | Davidson et al. | 260—592 |
| 3,342,585 | 9/1967 | Brown et al. | 71—123 |

FOREIGN PATENTS

| | | |
|---|---|---|
| 788,132 | 12/1957 | Great Britain. |
| 1,148,970 | 7/1957 | France. |

LEWIS GOTTS, Primary Examiner

G. HOLLRAH, Assistant Examiner

U.S. Cl. X.R.

11—66; 260—590, 591, 592, 599, 600